Patented June 15, 1937

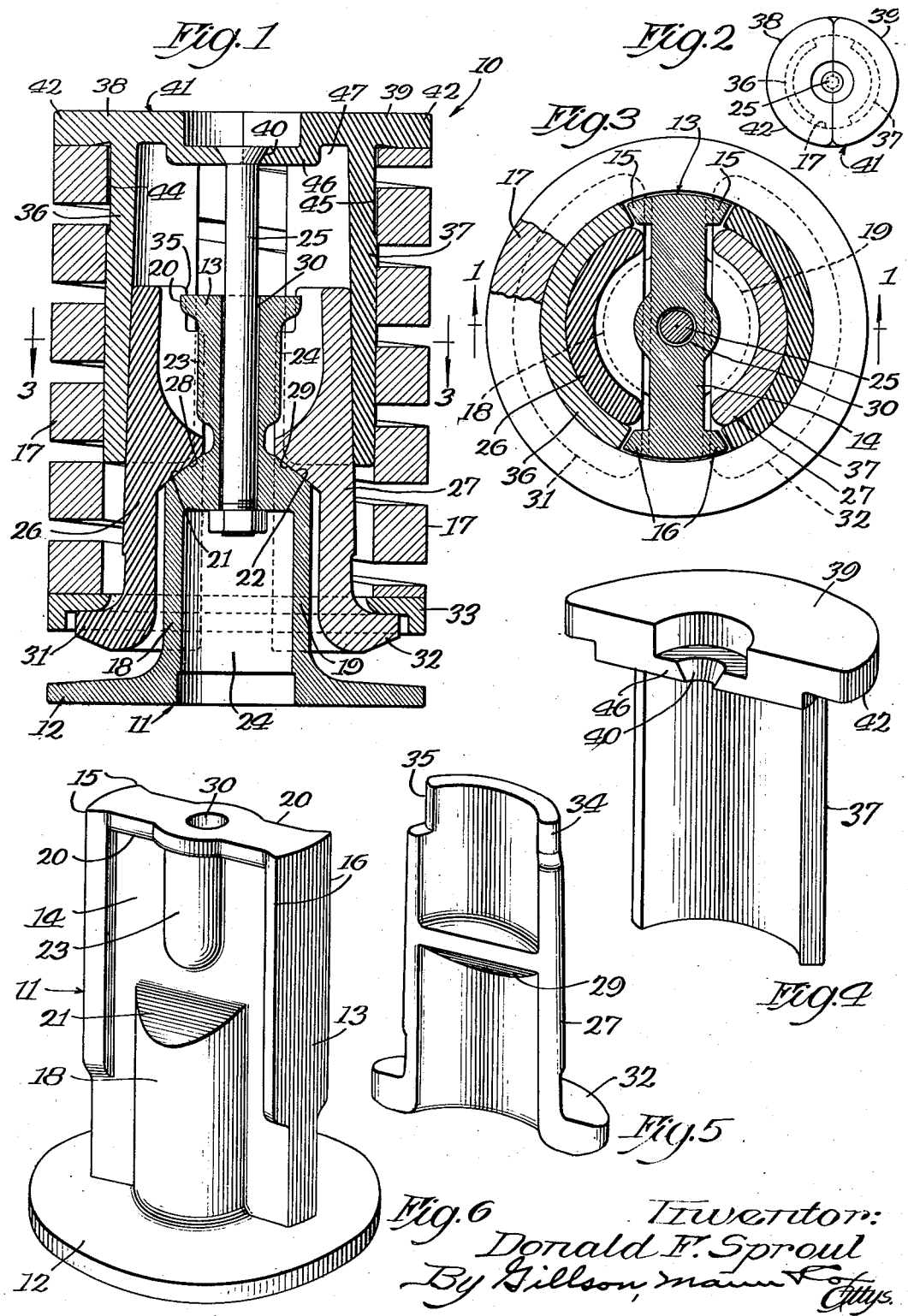

2,084,283

UNITED STATES PATENT OFFICE 2,084,283

CUSHIONING DEVICE

Donald F. Sproul, Chicago, Ill., assignor to Cardwell-Westinghouse Company, a corporation of Delaware Application October 24, 1934, Serial No. 749,794

7 Claims. (Cl. 267—9)

This invention relates to cushioning devices for use on railway trains and especially adapted for use in supporting the bolsters of railway trucks.

One of the objects of the invention is the provision of a cushioning device of the friction type for resiliently supporting bolsters of railway trucks and simultaneously preventing harmonic action of the spring assembly.

Another object of the invention is the simplification of the construction of devices of this type with the resultant decrease in wear and increase in the durability of the structure.

A still further object of the invention is the provision of a bolster supporting unit that is simple in construction, inexpensive to manufacture, efficient in use and which may be readily and easily installed.

Other and further objects and advantages of the invention will appear from the following description, taken in connection with the accompanying drawing, in which:—

Fig. 1 is a vertical section of the device on the lines 1—1 of Fig. 3;

Fig. 2 is a top plan view of the same on a smaller scale;

Fig. 3 is a section on the line 3—3 of Fig. 1 with parts broken away;

Fig. 4 is a perspective view of one of the friction members;

Fig. 5 is a perspective view of one of the friction shoes; and

Fig. 6 is a perspective view of the friction post or thrust member.

Referring now to the drawing, the reference character 10 designates the friction device in general which comprises the thrust or friction post 11, shown more clearly in Fig. 6. The friction post comprises a base flange 12 and the upstanding post member 13.

The post member 13 is I-form in cross section having the web portion 14 and the lateral extending flanges 15 and 16 which extend laterally in both directions along the edges of the web member 14.

The upper end of the post member 13 is also provided with laterally extending flanges 20 which also assist in reinforcing this member.

The flange portions 15 and 16 are curved on their outer faces to conform to the inner periphery of the spring 17 which surrounds the same, as will presently appear.

The web 14 adjacent the base is provided with enlarged portions 18 and 19 to form the wedging faces or shoulders 21 and 22 at its upper portion (see Figs. 1 and 6). These enlarged portions 18 and 19 also form a recess 24 which extends through the base 12 of the post. The portions of the web 14 outwardly of the shoulders 21 and 22 are also enlarged or thickened, as at 23 and 24.

An axial opening 30 extends through these enlarged portions into the recess 24 for the reception of the retaining bolt 25, as will presently appear.

A plurality of friction shoes 26 and 27 (in the present instance two) are provided with wedging faces 28 and 29 for engaging the corresponding wedge faces 21 and 22 of the friction post or thrust member 11. The lower ends of the friction shoes 26 and 27 are provided with flanges 31 and 32 on which is seated an annular spring seat 33.

The upper ends of the friction shoes 26 and 27 have their edges cut away as at 34 and 35 for providing clearance for the laterally extending flanges 20. By means of this arrangement the vertical edges of the shoes may be in close proximity to the web 14 of the post, thereby assisting in preventing relative rotation or skewing of the post and shoes.

The outer faces of the friction shoes 26 and 27 are curved transversely to provide friction surfaces which are frictionally engaged by the inner surface of friction members 36 and 37.

The upper or outer ends of the friction members 36 and 37 are provided with semi-circular head members 38 and 39, which together form a split circular cap member 41, as shown in Fig. 2 of the drawing. The head members 38 and 39 are provided with an outwardly extending flange 42 which extends entirely around the cap member 41 for forming a seat for spring 43 which surrounds and frictionally engages the outer surface of the friction members 36 and 37. The lower end of the spring 17 seats on the spring seat 33, as clearly shown in Fig. 1 of the drawing.

The spring 17 may be of any suitable construction, but preferably the inner surface of its turns are flattened to provide friction faces for frictionally engaging the outer surface of the friction members 36 and 37. As shown, the turns of the spring are rectangular in cross section. The friction members 36 and 37 have their upper portions reduced as at 44 and 45 so that the upper turns of the spring will not frictionally engage the same.

In the manufacture of springs, the internal diameter of the end turns of the springs are normally slightly less than that of the intermediate portions thereof, and unless the reduction at 44 and 45 is made, the intermediate portions of the spring will not make the proper contact with the friction members 36 and 37.

The cap member 41 is provided with a depressed portion 46 for engaging the upper end of the friction post 13 for limiting the compression of the gear. The groove 47 extending about the depression 46 will afford sufficient clearance for the upper ends of the friction shoes 26 and 27 when the gear goes solid. An axial opening 40 is provided through the cap 41, one-half in the head member 38 and the other one-half in the head member 39, and the bolt 25 extends through this opening and through an aligned opening 30 in the post 13 for holding the device in assembled relation.

In the normal operation of the device, when the device is compressed, the shoulders 21 and 22 force the friction shoes 26 and 27 outwardly into frictional contact with the friction members 36 and 37 and these members are held from radially expanding by the spring 17, thereby creating friction between said spring and said members. The friction thus created not only assists in supporting the load, but will also prevent harmonic action of the entire assembly.

The friction members 36 and 37 are prevented from moving laterally about the thrust member 11 by the flanges 15 and 16 on said member. In order to increase the capacity of the gear, these friction members may be slightly tapered downwardly in a longitudinal section, as shown in Fig. 1 of the drawing.

While the cap member 41 is described as being located at the top of the device, this is solely for convenience of description since the device may be employed in inverted form. Preferably, though not necessarily, the device has the overall dimensions of a conventional helical bolster supporting spring for railway cars and one or more of these devices or units may be substituted for a corresponding number of helical springs in the conventional bolster supporting spring assembly.

It is thought from the foregoing taken in connection with the accompanying drawing that the construction and operation of my device will be apparent to those skilled in the art, and that changes in size, shape, proportion and details of construction may be made without departing from the spirit and scope of the appended claims.

I claim as my invention:—

1. In a cushioning device, a friction post comprising a web portion, flanges extending along the side edges of said web portion, a spring surrounding said post, said flanges having curved outer faces conforming to the inner surface of said spring, said web portion being provided with enlarged portions on opposite sides thereof having wedging faces thereon, friction shoes having recesses extending about said enlarged portions and having wedging surfaces engaging said faces, flanges on said shoes, a spring seat on said flanges, and friction members between said spring and shoes and frictionally engaging the same, said shoes having semi-circular heads which together form a circular cap engaging the upper end of said spring and a bolt connecting said cap to said post for limiting the separation of the same.

2. In a cushioning device, a thrust member having wedging faces thereon, friction shoes having wedging surfaces engaging said faces, friction members frictionally engaging said shoes, said members being provided with head sections on their outer ends forming a two-part divided head, means on said head for engaging said thrust member for limiting the compression of said device, resilient means for resisting the lateral movement of said shoes and members and for resisting the compression of said device.

3. In a cushioning device, a thrust member having a base flange thereon, an extension on said member, an axial opening through said member and extension, friction faces on said member below said extension, friction shoes engaging said faces, said shoes having flanges on their lower portions, a helical spring supported by said flanges, friction members between said spring and shoes, said members having heads on their outer ends together forming a two-part divided circular head having a flange extending about the same for engaging said spring and a depressed central portion on said cap for engaging said extension for limiting the compression of said device.

4. In a cushioning device, a base having an upstanding thrust element, wedging faces on said element, friction shoes engaging said faces, a spring surrounding said shoes, a sectional cap composed of two parts only engaging said spring, a friction element carried by each section of said cap and interposed between said shoes and spring, and means on the cap sections for engaging said thrust element for limiting the compression of said device.

5. In a bolster supporting device, a thrust element having a flanged base, a post extending upwardly from said base and having inclined wedging faces at opposite sides thereof, said post having an axial opening, a pair of friction shoes having wedging surfaces engaging said faces and provided with spring seats, a pair of friction members engaging said shoes and having semi-circular heads which together form a circular follower, said follower having a central depression provided with an axial opening therethrough, a bolt extending through said openings for limiting the expansion of the gear, and a spring surrounding said members and seated against said seats and heads.

6. In a bolster supporting unit, a thrust element having a pair of wedging faces thereon, a pair of wedging shoes engaging said faces, a spring surrounding said shoes and element, and a pair of friction members between said shoes and spring for frictionally engaging said shoes and spring, said members being provided with segmental heads, a follower for said spring, said follower consisting of said segmental heads and having an axial depression, part of which is in one segmental portion of said follower and the other part in the other segmental portion of said follower, each of said members having reduced portions adjacent said head on the exterior thereof.

7. In a cushioning device for use on railway trains, a friction post having a base flange extending about the same at one end thereof, friction shoulders on an intermediate portion of said post, an extension on said post extending beyond said shoulders, friction shoes having wedging faces engaging said shoulders, flanges on the outer ends of said shoes, friction members frictionally engaging the outer surfaces of said shoes, said members being provided with semi-circular means which together form a follower having an axial opening, one portion of which is in one of said members and the other portion of which is in the other member, a helical spring surrounding said members and frictionally engaging the same, said spring being interposed between said semi-circular means and the flanges on said shoes, and a bolt extending through said opening and said extension for holding said unit in assembled relation.

DONALD F. SPROUL.